United States Patent Office 3,202,729
Patented Aug. 24, 1965

3,202,729
BUTADIENE-STYRENE RUBBER BLENDED WITH AROMATIC HYDROCARBON-FORMALDEHYDE RESIN
Lyman R. Roberts, Concord, Calif., assignor to Shell Oil Company, New York, N.Y., a corporation of Delaware
No Drawing. Filed Dec. 18, 1961, Ser. No. 160,307
3 Claims. (Cl. 260—887)

This invention relates to the production of improved rubber-resin compositions. More particularly, it relates to rubber compositions containing resinous extenders having improved properties.

Rubbers have been extended with a wide variety of materials, usually of an oily or resinous nature, for the purpose of reducing their cost and modifying their properties. Many of these extenders provide rubber compositions having improved viscosity, tack, scorch time, tensile strength, etc., but are either too expensive to be employed in many commercial applications, or, particularly the cheaper materials, are so highly colored that it is impossible to properly pigment the rubber compositions to a satisfactory light color. While it is true that certain resins can be produced having light color and that are useful with certain natural rubbers and the like, it is difficult to produce such resins from a cheap enough source that they are always practical to employ in rubber compositions. Where such resins have been prepared, it has usually been from coal tar sources and the like, necessitating elaborate refining procedures to eliminate color bodies which naturally occur in such products.

Resins can be produced from certain petroleum sources, but in this case again, most of these sources inherently contain the disadvantage of color bodies which degrade the product for many practical applications. On the other hand, light colored products may be obtained from certain petroleum sources but in many instances, these have been of such low molecular weight that they are unsuitable as extenders for rubbers even though they may be useful for other purposes in rubber compositions.

The problem of compatibility is one which limits still further the sources from which preferred materials can be drawn especially when compatibility is coupled with other requirements such as light color and suitable high molecular weight.

It is an object of this invention to improve rubber compositions. It is another object of the invention to provide a new class of special rubber extenders. It is a further object of the invention to provide rubber compositions of very light color. A particular object of the invention is to provide rubber compositions comprising diolefin-arylolefin compolymers extended with compatible light-colored hard resins obtained from certain petroleum sources. Other objects of the invention will become apparent during the following description of the invention.

Now, in accordance with the invention, improved rubber compositions are provided which comprise at least one copolymer of a conjugated diene and a vinyl aromatic compound, and a minor proportion of a light colored resinous condensation product formed between formaldehyde and an aromatic hydrocarbon fraction comprising at least 70% by weight of beta-alkyl naphthalenes (including $\beta,\beta'$-dialkylnaphthalenes), said fraction containing substantially no olefins and no alpha-alkyl naphthalenes, the condensation product having a softening point between about 200 and 280° F. and an average molecular weight between about 450 and about 650. More specifically, the preferred compositions comprise those in which the copolymer is an elastomeric copolymer of a vinyl aromatic compound and a conjugated diolefin having 4–6 carbon atoms per molecule, the resinous condensation product of formaldehyde being made with a hydrocarbon mixture boiling within the limits from about 450° F. to about 715° F., being free of olefins and alpha-alkyl naphthalenes, containing at least about 70% by weight of beta-alkyl naphthalenes (including $\beta,\beta'$-dialkylnaphthalenes), the condensation product having an average molecular weight of 475–600, a ring and ball softening point of 215–270° F. and an ASTM color of 4.5–7 in 20% benzene solution.

Optimum compositions are obtained when the mixture of hydrocarbons in which the condensation product is made also contains from 5 to 25% by weight of partially hydrogenated bicyclic aromatic hydrocarbons. Still further improvements in particular respect to compatibility are experienced when the rubbery copolymer is one having a diene:aryl olefin weight ratio between about 65:35 to about 90:10 (preferably 70:30 to about 85:15).

It is preferred that the resinous condensation product be present in the rubber compositions in an amount between about 5 and about 30% by weight.

The special light colored resinous condensation products having the properties defined above are preferably obtained by selection of very restricted stocks from petroleum sources. While it is possible of course to obtain the desired feed by preparing pure beta alkyl naphthalenes and diluting them, if desired, with partially hydrogenated bicyclic aromatic hydrocarbons, this is undesirable economically. It is much more efficient to utilize hydrocarbons meeting the requirements as long as undesirable components are virtually absent from a relatively cheap commercial source. Consequently, in accordance with one aspect of the present invention, it has been found that the bottoms fraction from a reforming operation of a hydrocarbon stream constitutes a highly desirable source of such hydrocarbons. This is due to the fact that olefins are virtually absent and that alpha-alkyl naphthalenes are also virtually absent from such streams, the bottoms product being composed almost exclusively of at least about 70% by weight of beta-alkyl naphthalenes (including $\beta,\beta'$-dialkylnaphthalenes), and possibly 5–25% by weight of partially hydrogenated bicyclic aromatic hydrocarbons, usually referred to as tetralins and indanes. Up to about 10% by weight of the mixture of aromatic hydrocarbons may be alkyl benzenes.

The reason for the composition of reforming bottoms is due to the fact that the objective of reforming is normally to convert naphthenes to aromatics. Certain side reactions also occur but it has been found that the bottom product obtained from the re-distillation of the platformed (or other reformed) product constitutes the optimum source of aromatic hydrocarbon feeds for use in forming the formaldehyde condensation product used in the compositions in this invention. During the reforming operations, it appears that any alpha-alkyl naphthalenes are reformed to beta-alkyl naphthalenes or other products.

The desirability of this particular source of hydrocarbon mixtures is predicated upon the finding that means are available for converting this mixture into resins having the required properties of light color, sufficiently high softening point and compatibility with the subject class of copolymers to be especially desirable for the extension of such copolymers. Aromatic extracts from refineries contain a variety of aromatic constituents but for the most part are unsuitable without further processing since they contain undesirable components leading either to colored resinous products or requiring longer times of resinification. Further search for suitable streams disclosed that aromatic petroleum fractions from lower boiling distillates such as virgin naphthas and the like contain aromatic components having a preponderance of alkyl benzenes while these could be resinified to form light colored products, these products were of such low molecular weight for any reasonable resinification time that they would not be useful as the principle extender for rubber compositions, even though they might be used as a portion of the extending resin. In view of the complex combination of physical requirements desired, the most preferred and economic source of suitable hydrocarbon feeds comprises the bottoms products obtained in the re-distillation of reformates, commonly referred to as "reformate bottoms." These bottoms have a preferred boiling range of 450–715° F. at atmospheric pressure, preferably 475–700° F.

While a number of catalytic systems are known for the resinification of aromatics, many of these have inherent characteristics excluding them from use in preparing the resins employed in the compositions of this invention. The reasons for such exclusion are two-fold; first, many of the milder catalysts cause resinification of too low a degree or require too long a time to be of economic interest. On the other hand, sulfuric acid or aluminum chloride result in relatively high molecular weight resins, but these always contain objectionable color bodies. While such color bodies can be eliminated by various purification procedures, it is highly desirable from an economic standpoint to utilize a catalyst system which does not create the color bodies as long as such a system causes sufficient resinification within a practical reaction time. Such a system has been found to be the combination of zinc chloride as a catalyst with a $C_{1-4}$ fatty acid as the reaction solvent, preferably under anhydrous conditions.

It is preferred to employ 1–7.5 volumes of a $C_{1-4}$ fatty acid per volume of the specified aromatic hydrocarbon feed. A concentration of zinc chloride in the order of 6–12% by weight based on the weight of the fatty acid while formaldehyde is preferably present in an amount between about 15 and 30% by weight based on the hydrocarbon feed.

Under these conditions, the polymers have desirable light color and high softening points desired for the present purpose.

Suitable hydrocarbon feeds useful in producing the desired light colored resins are as follows:

In a typical preparation of resins from such sources, 200 parts by volume of glacial acetic acid were mixed with 15 parts by weight of zinc chloride and 7.5 parts by weight of paraformaldehyde. These were heated at 50° C. with stirring to form a uniform solution, after which 37.5 parts by weight of platformate bottoms hydrocarbon feed was added. The reaction mixture was heated to reflux (115° C.) for 1 hour after which 100 parts by volume of water was added to coagulate the resin. The latter was dissolved in benzene and water washed to remove traces of acid and catalyst and from which benzene was removed under vacuum to isolate the resin. Typical products made by this process, while involving reaction times from about 0.5 to about 2.5 hours at the reflux temperature of the low molecular weight fatty acid employed, usually have softening points in the order of 200–280° F., average molecular weight of 450–650 and ASTM colors from about 4.0 to about 7 in 20% benzene solution.

The above-described light colored aromatic resins are to be utilized in accordance with the present invention for extending particular rubbers. The class of rubbers is restricted to those rubbers found to be compatible with the particular class of light colored resins with which the present invention is concerned. Such copolymers comprise copolymers of a conjugated diene with an aryl olefin. Preferably the conjugated diene is present in a major proportion and the aryl olefin is present in a minor proportion. The optimum weight ratios of diene to aryl olefins lie between 65:35 and 90:10, preferably between 70:30 and 85:15. The specific monomers employed may be varied and mixtures of each of the individual classes may be utilized. Preferably the diolefin is one having from 4 to 6 carbon atoms per molecule while the aryl olefin is preferably a vinyl aromatic hydrocarbon.

The preferred species of diene for use in the formation of copolymers (preferably elastomers) is butadiene. However, other conjugated dienes may be utilized for this purpose. In particular, conjugated dienes other than butadiene can be employed which contain from 4 to 8 carbon atoms per molecule and include, 1,3-butadiene, isoprene, 2-methyl-1,3-butadiene, piperylene, 2-methyl-1,3-pentadiene, 2,3-dimethyl-1,3-butadiene, chloroprene, and others. In a broader aspect of the invention, conjugated dienes having more than eight, such as twelve, carbon atoms per molecule can be used, particularly where the presence of various isomeric compounds can be tolerated. Furthermore, various alkoxy, such as methoxy and ethoxy, and cyano and chloro derivatives of these conjugated dienes, are also applicable. Thus, dienes, such as phenyl-butadiene, 2,3-dimethyl-1,3-hexadiene, 2-methoxy-3-ethyl butadiene, 2-ethoxy-3-ethyl-1,3-hexadiene, 2-cyano-1, 3-butadiene, and 2,3-diethyl-1,3-octadiene are applicable.

Suitable vinyl aromatics include particularly styrene, alkyl and substituted alkyl styrenes, para-chlorostyrenes, para-methoxystyrene, alpha methyl styrene, and vinyl naphthalene, in addition to para-benzyl styrene, para-phenyl styrene, meta-sec-butyl styrene, para-isopropyl styrene, 2,4-dimethoxy styrene; halo-styrenes including 2,3-, 2,5-, and 3,4-di-chloro styrenes in addition to para-cyano styrene, meta-nitro styrene and vinyl pyridines. Examples of such compounds are 2-vinylpyridine; 2-vinyl-5-ethyl pyridine; 2-methyl-5-vinylpyridine; 4-vinylpyridine; 2,3,4-trimethyl-5-vinylpyridine; 3,4,5,6-tetramethyl-2-vinylpyridine; 3-ethyl-5-vinylpyridine; 2,6-diethyl-4-vinylpyridine; 2-isopropyl-4-nonyl-5-vinylpyridine; 2-methyl-5-undecyl-3-vinylpyridine; 2,4 - dimethyl-5,6-dipentyl-3-vinylpyridine; 2-decyl-5-(alpha-methylvinyl)pyridine; 2-vinyl-3-methyl-

*Table I*

AROMATIC HYDROCARBON FEEDS

| Sample | 1 | 2 | 3 | 4 | 5 | 6 | 7 | 8 |
|---|---|---|---|---|---|---|---|---|
| Yield, Percent w. on Total Reformate | 0.89 | 1.01 | 1.00 | 1.00 | 0.97 | 0.98 | 0.99 | 0.97 |
| Gravity, °API | 8.8 | 10.2 | 9.5 | 9.3 | 9.7 | 10.7 | 10.9 | 11.3 |
| ASTM Distillation, °F.: | | | | | | | | |
| IBP | 486 | 452 | 474 | 472 | 470 | 462 | 460 | 454 |
| EP | 700 | 656 | 684 | 684 | 678 | 652 | 636 | 644 |
| 10% | 498 | 488 | 486 | 486 | 580 | 470 | 470 | 468 |
| 50% | 508 | 502 | 500 | 500 | 496 | 486 | 486 | 488 |
| 90% | 576 | 548 | 546 | 552 | 544 | 536 | 532 | 520 |
| Flash Point, °F., PM cc | 250 | 230 | 240 | 235 | 240 | 235 | 230 | 225 |
| Color, ASTM, D-1500 | L 6.5 | L 5.0 | L 5.0 | L 5.5 | L 5.0 | L 4.0 | L 3.5 | L 3.5 |
| Aromatics Distribution, Percent v.: | | | | | | | | |
| Anthracenes and Phenanthrenes | 0.2 | 0.1 | 0.2 | 0.2 | 0.2 | | | |
| Diphenyls | 2.6 | 1.9 | 2.2 | 2.3 | 2.0 | 0.8 | 1.3 | 1.2 |
| Naphthalenes | 87.5 | 79.9 | 81.7 | 81.7 | 79.3 | 71.8 | 70.9 | 67.0 |
| Tetralins and Indanes | 9.7 | 15.1 | 13.2 | 13.0 | 14.8 | 20.9 | 20.9 | 22.9 |
| Alkyl Benzenes | | 3.0 | 2.7 | 2.8 | 3.7 | 6.5 | 6.9 | 8.9 |

5-ethylpyridine; 2 - methoxy-4-chloro-6-vinylpyridine; 3-vinyl-5-ethoxypyridine; 2 - vinyl - 4,5-dichloropyridine; 2-(alpha-methylvinyl)-4-hydroxy-6-cyanopyridine; 2-vinyl-4-phenoxy-5-methylpyridine; 2-cyano-5-(alpha-methylvinyl) pyridine; 3-vinyl-5-phenylpyridine; 2-(para-methylphenyl)-3-vinyl-4-methylpyridine, 3-vinyl-5-(hydroxyphenyl)pyridine; 2-vinyl-quinoline; 2-vinyl-4-ethylquinoline; 3-vinyl-6,7-di-n-propylquinoline; 2-methyl-4-nonyl-6-vinylquinoline; 4-(alpha-methylvinyl)-8-dodecylquinoline; 3-vinylisoquinoline; 1,6-dimethyl-3-vinylisoquinoline; 2-vinyl-4-benzylquinoline; 3-vinyl-5-chloroethylquinoline; 3-vinyl-5,6-dichloroisoquinoline; 2-vinyl-6-ethoxy-7-methylquinoline; 3-vinyl-6-hydroxymethylisoquinoline; and the like.

The process for polymerization comprise any of the well known methods for this purpose, broadly including both hot and cold rubbers, preferably prepared by emulsion polymerization.

One aspect of the present invention comprises the discovery of excellent compatability between the subject class of copolymers (elastomers) and the class of resinous aromatic hydrocarbon-formaldehyde reaction products. The compositions may be prepared in emulsion form (latices) or by milling the two solid ingredients in the usual rubber compounding mills.

The improvement in certain properties of styrene-butadiene rubber is exemplified by the following comparative data, wherein a styrene-butadiene rubber containing 22.5% by weight of bound styrene was modified with 10 and 20% of an aromatic resin prepared from platformer bottoms and formaldehyde. This resin has the following properties:

Molecular weight _____ 460
Softening point, ring and ball, ° F. _____ 222
ASTM color, 20% soln. in benzene _____ 4.5

Table II
PROPERTIES OF RESIN REINFORCED WHITE STYRENE-BUTADIENE RUBBER COMPOUNDS

| Compound Number | A | B | C |
|---|---|---|---|
| | Recipe, phr. | | |
| Styrene-Butadiene Rubber (22.5% styrene) | 100 | 100 | 100 |
| Resin | 0 | 10 | 20 |
| Zinc Oxide | 10 | 10 | 10 |
| Sulfur | 2.5 | 2.5 | 2.5 |
| Lithopone | 208 | 208 | 208 |

PROPERTIES OF RAW COMPOUNDS

| | | | |
|---|---|---|---|
| Mooney Viscosity | 65 | 62.5 | 56.5 |
| Mooney Scorch time, Min. to 15 mil rise | 48.5 | >60 | >60 |
| Green Strength, p.s.i | 50 | 50 | 49 |

PROPERTIES OF CURED COMPOUNDS

| | | | |
|---|---|---|---|
| Cure Time Minutes at 300° F | 45 | 60 | 60 |
| Tensile Strength, p.s.i | 650 | 1,660 | 1,980 |
| 300% Modulus, p.s.i | 380 | 380 | 350 |
| Elongation at Break, percent | 400 | 520 | 570 |
| Shore A Hardness | 62 | 59 | 53 |
| Permanent Set, percent | 0 | 5 | 9 |
| Tear Resistance, Crescent, lb./in | 102 | 106 | 131 |

COMPOUNDS AGED 3 DAYS AT 210° F.

| | | | |
|---|---|---|---|
| Tensile Strength, p.s.i | 650 | 1,470 | 1,770 |
| 300% Modulus, p.s.i | 480 | 600 | 650 |
| Elongation at Break, percent | 360 | 460 | 480 |
| Shore A Hardness | 70 | 66 | 62 |
| Permanent Set, percent | 2 | 9 | 10 |

REFLECTANCE READING CURED COMPOUNDS, PERCENT

| | | | |
|---|---|---|---|
| 0 Hours in Light Cabinet | 79 | | 74 |
| 24 Hours in Light Cabinet | 16 | | 17 |

The above compositions were prepared by homogenizing the resin and rubber with mill rolls at a temperature above the softening point of the resin (250° F.). The mixture was then cooled and the remaining specified ingredients were added with the rolls fully cooled. In milling the compounds, the resin aided greatly in the incorporation of fillers. The data indicate that the resin requires a longer cure time and higher scorch value than previously employed resins of otherwise similar nature. Cure retardation can be an advantage in certain fabricating applications. The plasticizing effect of the resins is illustrated by the change in the Mooney viscosity. The data on the properties of cured compounds show large increases in tensile strength and elongation at break as rubber is compounded with the resin.

I claim as my invention:

1. As a new composition of matter, a major proportion of styrene-butadiene rubber and a minor proportion of a light colored resinous condensation product of formaldehyde with an aromatic hydrocarbon mixture boiling within the limits from about 460° F. to about 700° F., said mixture being substantially free of olefins and of alpha-alkyl naphthalenes and comprising at least about 70% by weight of beta-alkyl naphthalenes, the condensation product having an average molecular weight of 475–600, a ring and ball softening point of 215–270° F. and an ASTM color of 5–7 in 20% benzene solution.

2. A composition according to claim 1 wherein the hydrocarbon mixture contains 5–25% by weight of partially hydrogenated bicyclic aromatic hydrocarbons.

3. A composition according to claim 1 wherein the resinous condensation product is present in an amount between about 5 and 30% by weight.

References Cited by the Examiner
UNITED STATES PATENTS

| | | | |
|---|---|---|---|
| 2,367,183 | 1/45 | Byrns | 260—67 |
| 2,397,398 | 3/46 | Badertscher et al. | 260—67 |
| 2,597,159 | 5/52 | May et al. | 260—67 |
| 2,713,571 | 7/55 | Gordon et al. | 260—67 |
| 2,916,471 | 12/59 | Rosahl et al. | 260—890 |
| 3,037,877 | 6/62 | Hutchings | 260—67 |

OTHER REFERENCES

Ludwig et al.: India Rubber World, vol. 112 (1945).

MURRAY TILLMAN, Primary Examiner.

L. J. BERCOVITZ, Examiner.